(12) United States Patent
Millsap et al.

(10) Patent No.: US 6,481,526 B1
(45) Date of Patent: Nov. 19, 2002

(54) STEER-BY-WIRE HANDWHEEL ACTUATOR INCORPORATING MECHANISM FOR VARIABLE END-OF-TRAVEL

(75) Inventors: Scott A. Millsap; Chad David Bauer; Michael James Cole, all of Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/711,425

(22) Filed: Nov. 13, 2000

(51) Int. Cl.$^7$ ................................................ B62D 5/04
(52) U.S. Cl. ........................................ 180/402; 701/42
(58) Field of Search ................................ 180/402, 443, 180/444, 445, 446; 701/41, 42

(56) References Cited

U.S. PATENT DOCUMENTS

| | | | |
|---|---|---|---|
| 4,860,844 A | * 8/1989 | O'Neil | 180/402 |
| 6,059,068 A | * 5/2000 | Kato et al. | 180/402 |
| 6,176,341 B1 | * 1/2001 | Ansari | 180/402 |
| 6,213,248 B1 | * 4/2001 | Kawaguchi et al. | 180/402 |
| 6,345,681 B1 | * 2/2002 | Hackl et al. | 180/402 |

* cited by examiner

Primary Examiner—Kevin Hurley
(74) Attorney, Agent, or Firm—Edmund P. Anderson (57) ABSTRACT

A steer-by-wire handwheel actuator in a vehicle is presented. The handwheel actuator comprises a controller operative to accept as input thereto data from the steer-by-wire system and generate therefrom control signals; a driver input shaft; a gear train connected to the driver input shaft; a variable stop motor responsive to the control signals from the controller and variably geared to the gear train; a feedback motor responsive to the control signals from the controller and geared to one of the driver input shaft and the gear train; and a stop mechanism attached to a housing and coupled to one of the feedback motor and the gear train.

19 Claims, 7 Drawing Sheets

STEER-BY-WIRE HANDWHEEL ACTUATOR INCORPORATING MECHANISM FOR VARIABLE END-OF-TRAVEL

TECHNICAL FIELD

This invention relates to a steer-by-wire handwheel actuator incorporating a mechanism for variable end-of-travel.

BACKGROUND OF THE INVENTION

Current steer-by-wire steering systems are incapable of providing tactile indication of steering end-of-travel to the driver if the kinematic relationship between the steering wheel angle command from the driver and the position of the front road wheels is adjusted by electronic controls. This kinematic relationship is commonly referred to as the overall steering ratio. Traditional, mechanically linked steering systems have a mechanically constrained steering ratio that is determined by steering gear ratio, steering arm length and the physical orientation of the steering gear and the front road wheel assemblies in the vehicle. Current steer-by-wire handwheel actuators allow for only a fixed angular travel of the steering wheel. This invention improves the steer-by-wire system by allowing the control electronics to adjust the overall steering ratio in response to vehicle dynamics. Control software also provides an adjustable end of steering travel indication to the driver when the front road wheels have reached their maximum angular travel. This provides an indication of front road wheel end-of-travel as well as road force feedback to the driver.

SUMMARY OF THE INVENTION

It is therefore an objective of the present invention to provide a steer-by-wire handwheel actuator in a vehicle. The handwheel actuator comprises a controller operative to accept as input thereto data from the steer-by-wire system and generate therefrom control signals; a driver input shaft; a gear train connected to the driver input shaft; a variable stop motor responsive to the control signals from the controller and variably geared to the gear train; a feedback motor responsive to the control signals from the controller and geared to one of the driver input shaft and the gear train; and a stop mechanism attached to a housing and coupled to one of the feedback motor and the gear train.

It is also an object of the present invention to provide a method of varying the gear ratio of a handwheel actuator of a steer-by-wire steering system comprising measuring the position of the driver input shaft; measuring the speed of the vehicle; and calculating the desired position of the end-of-travel of the driver input shaft. The method further comprises measuring the position of the stop mechanism; and providing a first control signal to the variable stop motor for controlling the input of the variable stop motor to the planetary gear train.

It is still further an object of the present invention to provide a method of providing tactile response to a driver of a steer-by-wire handwheel actuator. The method comprises measuring the road forces acting upon the steer-by-wire system; measuring the position of the driver input shaft; measuring speed of the vehicle; and calculating the desired feedback torque of the driver input shaft. The method further comprises measuring the torque of the driver input shaft; and providing a second control signal to the feedback motor for controlling the feedback torque of the feedback motor to the driver input shaft or the carrier.

DESCRIPTION OF THE PREFERRED EMBODIMENT

Figure 1:
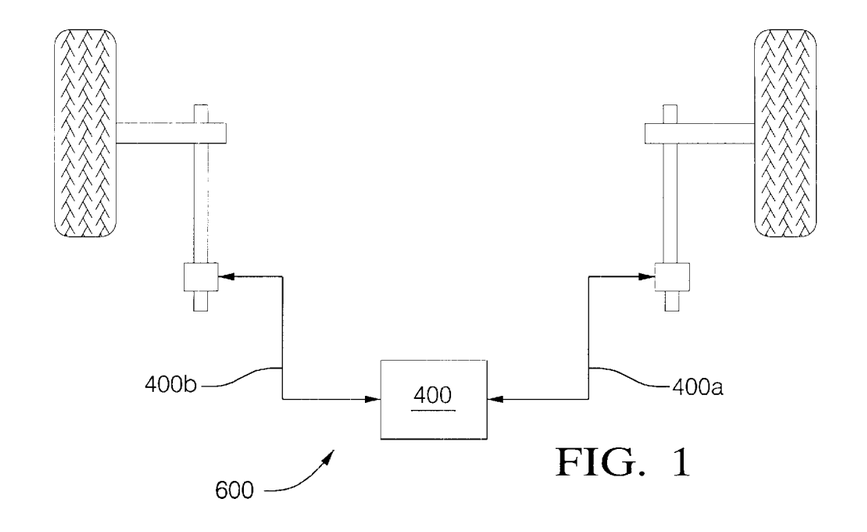
FIG. 1 is a schematic representation of a typical steer-by-wire steering system.
Figure 2:
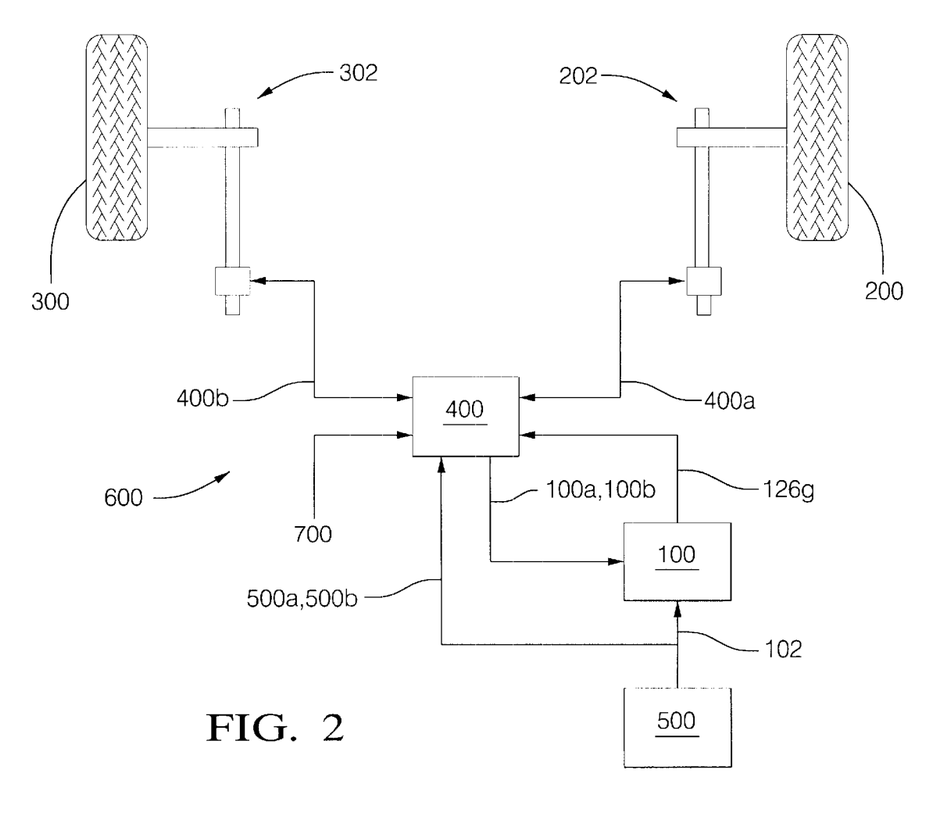
FIG. 2 is a schematic representation of the steer-by-wire handwheel actuator of the present invention in signal communication with the steer-by-wire steering system of FIG. 1.

A description of the preferred embodiment of the present invention will now be had, by way of exemplification and not limitation, with reference to FIGS. 1 through 8. FIG. 1 is a schematic representation of a typical steer-by-wire steering system 600 as it is generally comprised of a controller 400, a first electro-mechanical actuator 202 and a second electro-mechanical actuator 302, each in signal communication 400a, 400b with the controller 400. The first and second electromechanical actuators 202, 302, typically comprising a motor, crank arm, steering arm and tie rod, are in turn connected respectively to a first wheel 200 and a second wheel 300 and are operative thereby to turn the wheels 200, 300 under the command of the controller 400. FIG. 2 is a schematic representation of the handwheel actuator 100 of the present invention in signal communication 100a, 100b, 126g with the controller 400 of the steer-by-wire steering system 600 of FIG. 1. In FIG. 2, the handwheel actuator 100 is in further communication with an external motive source 500, such as a driver from whom the handwheel actuator 100 receives steering commands by way of a driver input shaft 102. The controller 400 is also operative to receive as input thereto a signal 700 indicative of vehicle velocity, as well as a signal 500a indicative of the position of the driver input shaft 102 and a signal 500b indicative of the torque on the driver input shaft 102.

Figure 3:
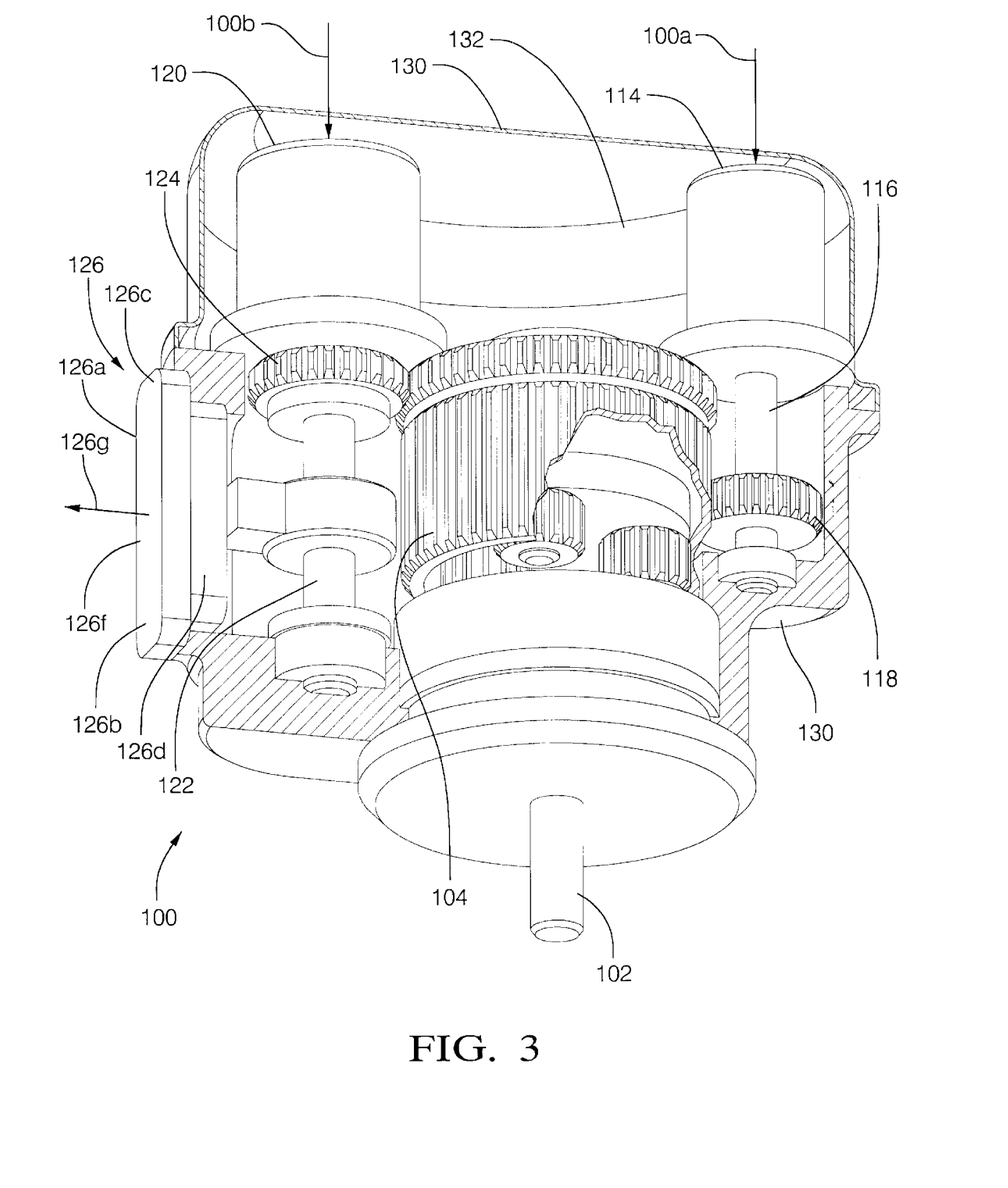
FIG. 3 is a first representation of the steer-by-wire handwheel actuator of the present invention.
Figure 6:
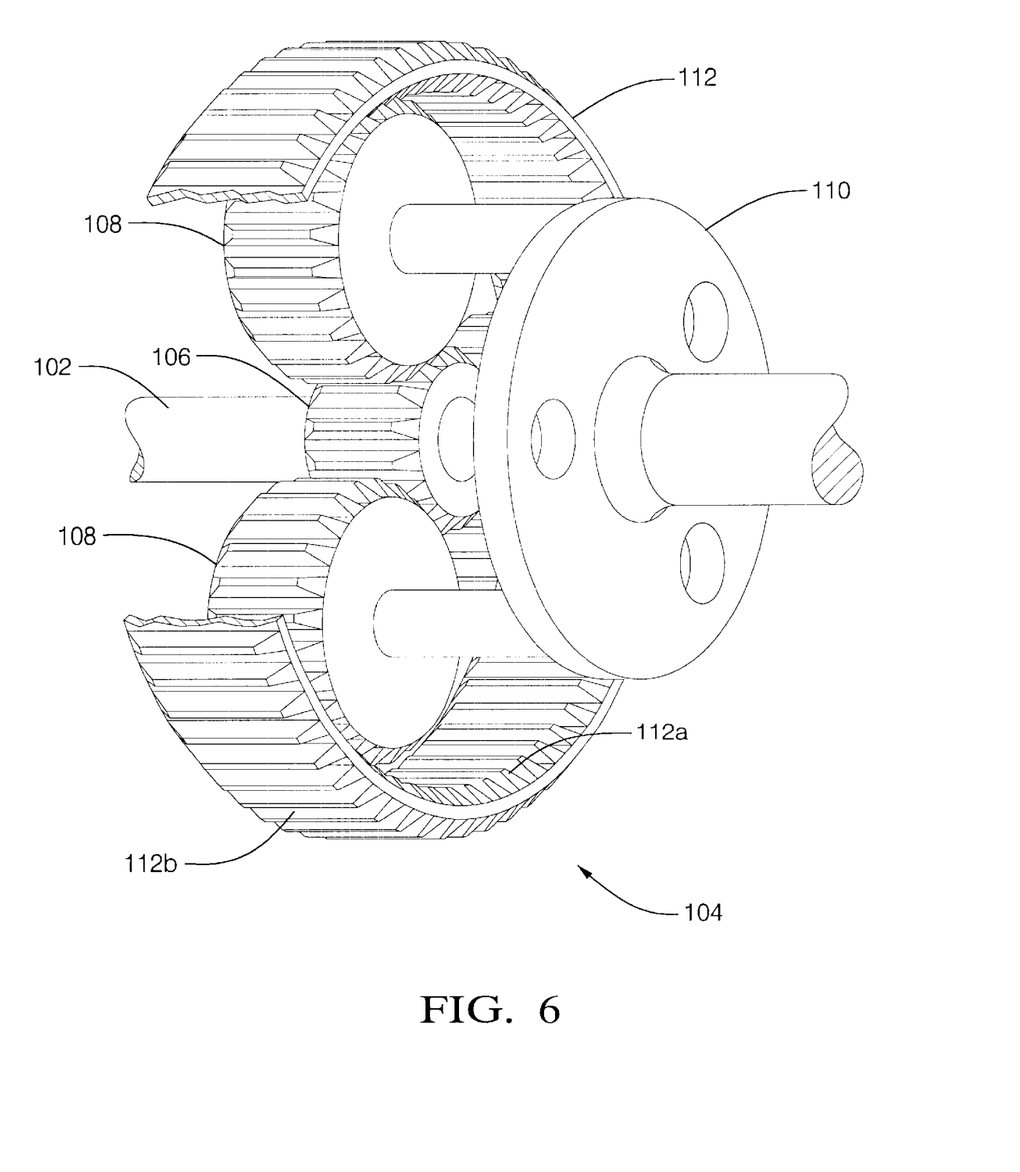
FIG. 6 is a depiction of the planetary gear train of the present invention.

With reference to FIG. 3, therein depicted is a first representation of the handwheel actuator 100 of the present invention. The handwheel actuator 100 is comprised of a housing 130, a driver input shaft 102 and a planetary gear train 104 rotatively attached to the driver input shaft 102. In the interest of clarity, the planetary gear train 104 comprising a sun gear 106, a plurality of planet gears 108, a carrier 110 and a ring gear 112 having interior and exterior gear teeth 112a, 112b is shown in FIG. 6. The handwheel actuator 100 of FIG. 3 includes a variable stop motor 114 having a variable stop motor shaft 116 rotatively driven by the variable stop motor 114. Attached to the variable stop motor shaft 116 is a variable stop assist gear 118 variably geared to the ring gear 112 of the planetary gear train 104. Continuing in FIG. 3, the handwheel actuator 100 further includes a feedback motor 120 having a feedback motor shaft 122 rotatively driven by the feedback motor 120.

Attached to the feedback motor shaft 122 is a feedback assist gear 124 geared to the carrier 110 of the planetary gear train 104. Still further, the handwheel actuator 100 includes a stop mechanism 126 connected to the housing 130 including a stop guide 126a having a first stop end 126b and a second stop end 126c. The stop mechanism 126 also includes a collar 126d coupled to the feedback motor shaft 122 and the stop guide 126a. The collar 126d is coupled to the feedback motor shaft 122 in the manner, for example, of a lead screw such that the extent of the axial motion of the collar 126d along the feedback motor shaft 122 is limited by the first stop end 126b and the second stop end 126c. The stop mechanism 126 also includes a sensor 126f operative to measure the position of the collar 126d and to provide as output therefrom a stop signal 126g indicative of the position of the collar 126d. The stop signal 126g is provided to the controller 400 for determining a first control signal 100a for controlling the variable stop motor 114.

In FIG. 3, in conjunction with FIG. 2, the handwheel actuator 100 is operative to accept as input thereto, firstly, steering commands by way of the driver input shaft 102 from an outside motive source such as a driver 500, secondly, the first control signal 100a from the controller 400 to the variable speed motor 114 and thirdly, a second control signal 100b from the controller 400 to the feedback motor 120. The steering commands are typically the clockwise or counterclockwise rotation of the driver input shaft 102. The first control signal 100a originating from the controller 400 controls the input to the planetary gear train 104 of the variable stop motor 114. The second control signal 100b controls the feedback torque directed to the carrier 110 by the feedback motor 120.

In FIG. 3, the clockwise or counterclockwise rotation of the driver input shaft 102 instigates the action of the planetary gear train 104 such that under a first set of vehicular operating conditions, the ring gear 112 may be held in place by the engagement of the variable stop motor 114 to the planetary gear train 104 by way of the variable stop motor shaft 116 and the variable stop assist gear 118. Such engagement results in a first gear ratio, $R_1$, of the planetary gear train 104. As vehicular operating conditions change, e.g., a change in vehicular speed or a change in the position of the driver input shaft 102, the first control signal 100a, based upon the changing operating conditions, activates the variable stop motor 114 so as to provide an additional degree of freedom to the planetary gear train 104, namely releasing the ring gear 112 and allowing controlled rotation thereof. The rotation of the ring gear 112 due to the combination of the action of the variable stop motor 114 and the steering commands from the driver 500, results in a net angular rotation at the carrier 110, thus providing a continuous and controlled variability in the gear ratio of the planetary gear train 104. Based upon the aforesaid changing operating conditions, plus the application of road forces acting upon the steer-by-wire system 600, the second control signal 100b activates the feedback motor 120 so as to provide a counter torque to the planetary gear train 104 by way of the engagement of the feedback motor 120 to the carrier 110 through the feedback motor shaft 122 and the feedback assist gear 124. The counter torque results in a feedback torque that provides the driver 500 with a tactile response to steering commands. A portion of the feedback motor 120 torque is reflected back to the driver input shaft 102 and the remainder is reflected back to the variable stop motor 114 through the ring gear 112, the variable stop assist gear 118 and the variable stop motor shaft 116.

Figure 4:
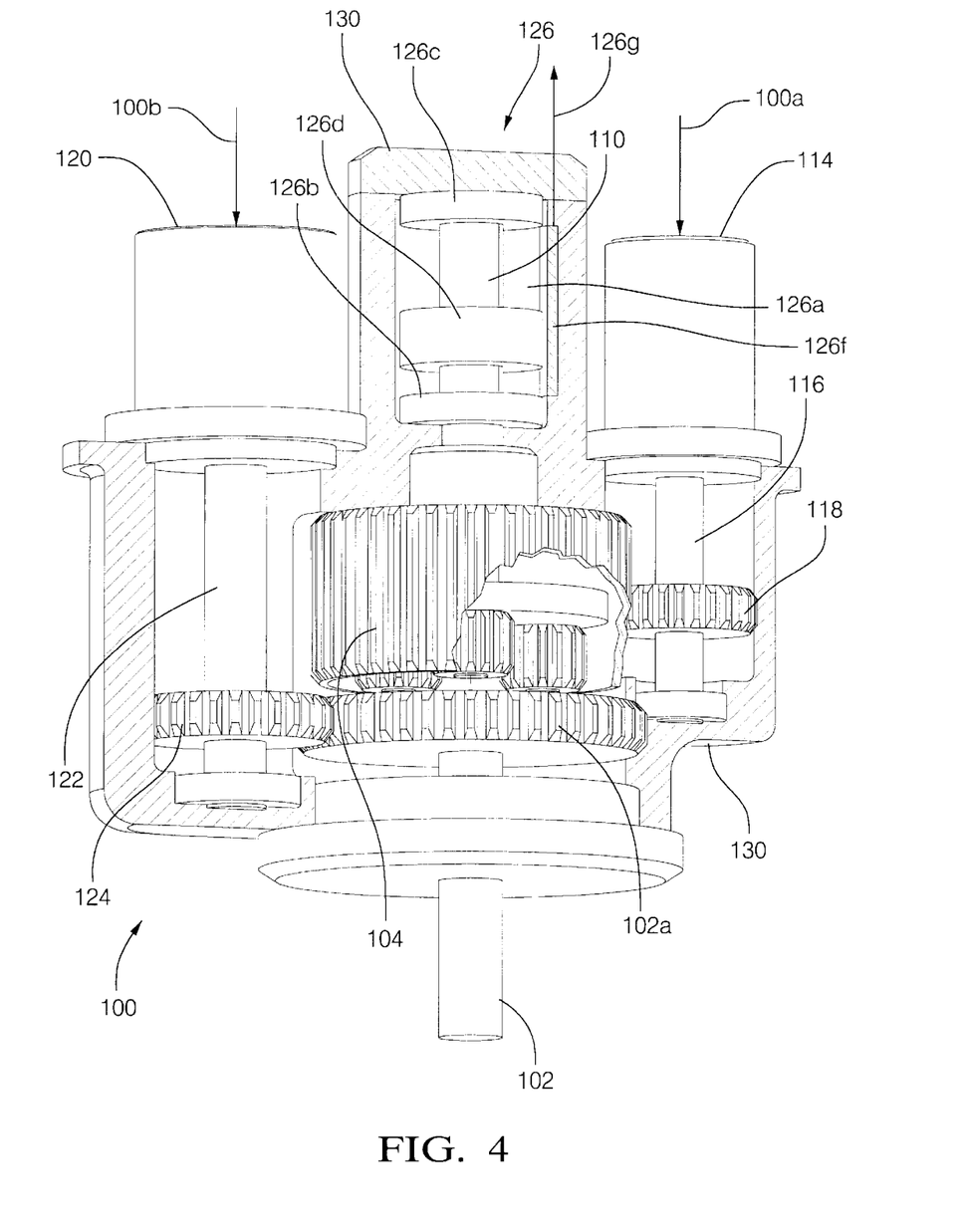
FIG. 4 is a second representation of the steer-by-wire handwheel actuator of the present invention.

Reference will now be had to FIG. 4. Therein depicted is a second representation of the steer-by-wire handwheel actuator 100 of the present invention, wherein like elements and features of the handwheel actuator 100 are numbered as in FIG. 3. In the embodiment of FIG. 4, the collar 126d is coupled directly to the carrier 110 of the planetary gear train 104 and is operative thereby to translate along the carrier 110 between the first stop end 126b and the second stop end 126c of the stop guide 126a as the carrier 110 rotates in response to driver 500 steering commands at the driver input shaft 102 and the action of the variable stop motor 114. The first and second stop ends 126b, 126c are connected to the housing 130. The collar 126d is coupled to the carrier 110 in the manner, for example, of a lead screw such that the extent of the axial motion of the collar 126d is limited by the first stop end 126b and the second stop end 126c. The stop mechanism 126 also includes a sensor 126f operative to measure the position of the collar 126d and to provide as output therefrom a stop signal 126g indicative of the position of the collar 126d. The stop signal 126g is provided to the controller 400 for determining a first control signal 100a for controlling the variable stop motor 114.

In FIG. 4, in conjunction with FIG. 2, the handwheel actuator 100 is operative to accept as input thereto, firstly, steering commands by way of the driver input shaft 102 from an outside motive source such as a driver 500, secondly, the first control signal 100a from the controller 400 to the variable speed motor 114 and thirdly, a second control signal 100b from the controller 400 to the feedback motor 120. The steering commands are typically the clockwise or counterclockwise rotation of the driver input shaft 102. The first control signal 100a originating from the controller 400 controls the input to the planetary gear train 104 of the variable stop motor 114. The second control signal 100b controls the feedback torque directed to the driver input shaft 102 by the feedback motor 120. In FIG. 4, the feedback motor 120 is coupled directly to the driver input shaft 102 by way of a driver feedback gear 102a connected to the driver input shaft 102, the feedback assist gear 124 and the feedback motor shaft 122.

In FIG. 4, the clockwise or counterclockwise rotation of the driver input shaft 102 instigates the action of the planetary gear train 104 such that under a first set of vehicular operating conditions, the ring gear 112 may be held in place by the engagement of the variable stop motor 114 to the planetary gear train 104 by way of the variable stop motor shaft 116 and the variable stop assist gear 118. Such engagement results in a first gear ratio, $R_1$, of the planetary gear train 104. As vehicular operating conditions change, e.g., a change in vehicular speed or a change in the position of the driver input shaft 102, the first control signal 100a, based upon the changing operating conditions, activates the variable stop motor 114 so as to provide an additional degree of freedom to the planetary gear train 104, namely releasing the ring gear 112 and allowing controlled rotation thereof. The rotation of the ring gear 112 due to the combination of the action of the variable stop motor 114 and the steering commands from the driver 500, results in a net angular rotation at the carrier 110, thus providing a continuous and controlled variability in the gear ratio of the planetary gear train 104. Based upon the aforesaid changing operating conditions, plus the application of road forces acting upon the steer-by-wire system 600, the second control signal 100b from the controller 400 activates the feedback motor 120 so as to provide a counter torque to the driver input shaft 102 by way of the engagement of the feedback motor 120 to the driver feedback gear 102a through the feedback motor shaft 122 and the feedback assist gear 124. The counter torque results in a feedback torque that provides the driver 500 with a tactile response to steering commands. A portion of the feedback motor 120 torque is reflected back to the driver input shaft 102 and the remainder is reflected back to the variable stop motor 114 through the ring gear 112, the variable stop assist gear 118 and the variable stop motor shaft 116.

Figure 5:
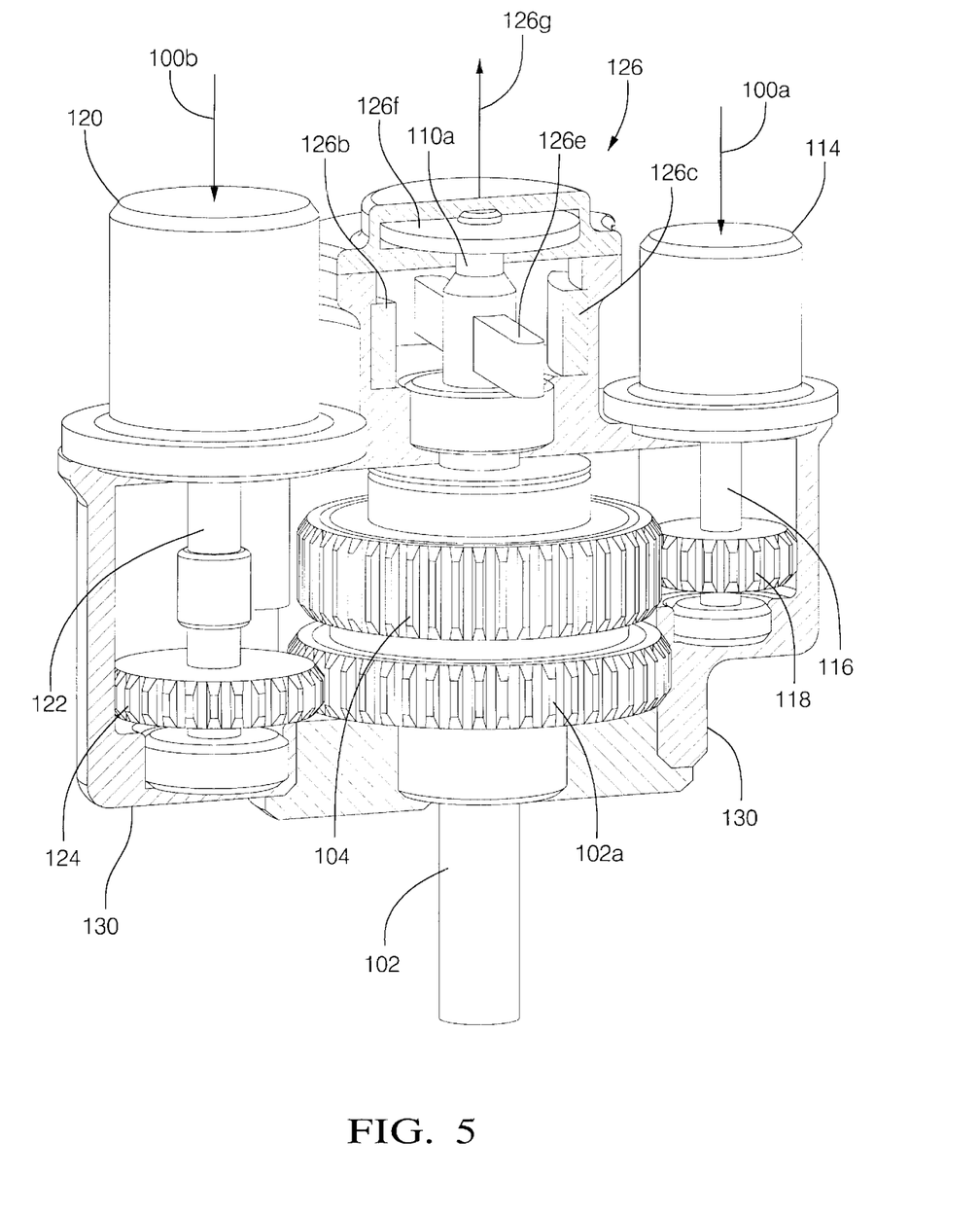
FIG. 5 is a third representation of the steer-by-wire handwheel actuator of the present invention.

Reference is now made to FIG. 5. Therein depicted is a third representation of the steer-by-wire handwheel actuator 100 of the present invention wherein like elements and features are numbered as in FIGS. 3 and 4. In the embodiment of FIG. 5, the stop mechanism 126 includes a shaft 110a connected to the carrier 110 so as to rotate therewith. A bar 126e is affixed to the shaft 110a such that as the shaft 110a rotates, the bar 126e, and thus the shaft 110a, is mechanically constrained as the bar 126e makes simultaneous contact with the first stop end 126b and the second stop end 126c. The first and second stop ends 126b, 126c are connected to the housing 130. The aforementioned feedback torque supplied to the driver 500 is applied through the feedback assist gear 124 to the driver input shaft 102 by way of the driver feedback gear 102a. The stop mechanism 126 also includes a sensor 126f operative to measure the position of the bar 126e and to provide as output therefrom a stop signal 126g indicative of the position of the bar 126e. The stop signal 126g is provided to the controller 400 for determining a first control signal 100a for controlling the variable stop motor 114.

In FIG. 5, in conjunction with FIG. 2, the handwheel actuator 100 is operative to accept as input thereto, firstly, steering commands by way of the driver input shaft 102 from an outside motive source such as a driver 500, secondly, the first control signal 100a from the controller 400 to the variable speed motor 114 and thirdly, a second control signal 100b from the controller 400 to the feedback motor 120. The steering commands are typically the clockwise or counterclockwise rotation of the driver input shaft 102. The first control signal 100a originating from the controller 400 controls the input to the planetary gear train 104 of the variable stop motor 114. The second control signal 100b controls the feedback torque directed to the driver input shaft 102 by the feedback motor 120.

In FIG. 5, the clockwise or counterclockwise rotation of the driver input shaft 102 instigates the action of the planetary gear train 104 such that under a first set of vehicular operating conditions, the ring gear 112 may be held in place by the engagement of the variable stop motor 114 to the planetary gear train 104 by way of the variable stop motor shaft 116 and the variable stop assist gear 118. Such engagement results in a first gear ratio, $R_1$, of the planetary gear train 104. As vehicular operating conditions change, e.g., a change in vehicular speed or a change in the position of the driver input shaft 102, the first control signal 100a, based upon the changing operating conditions, activates the variable stop motor 114 so as to provide an additional degree of freedom to the planetary gear train 104, namely releasing the ring gear 112 and allowing controlled rotation thereof. The rotation of the ring gear 112 due to the combination of the action of the variable stop motor 114 and the steering commands from the driver 500, results in a net angular rotation at the carrier 110, thus providing a continuous and controlled variability in the gear ratio of the planetary gear train 104. Based upon the aforesaid changing operating conditions, plus the application of road forces acting upon the steer-by-wire system 600, the second control signal 100b from the controller 400 activates the feedback motor 120 so as to provide a counter torque to the planetary gear train 104 by way of the engagement of the feedback motor 120 to the driver input shaft 102 through the feedback motor shaft 122, the feedback assist gear 124 and the driver feedback gear 102a. The counter torque results in a feedback torque that provides the driver 500 with a tactile response to steering commands. A portion of the feedback motor 120 torque is reflected back to the driver input shaft 102 and the remainder is reflected back to the variable stop motor 114 through the ring gear 112, the variable stop assist gear 118 and the variable stop motor shaft 116.

Figure 7:
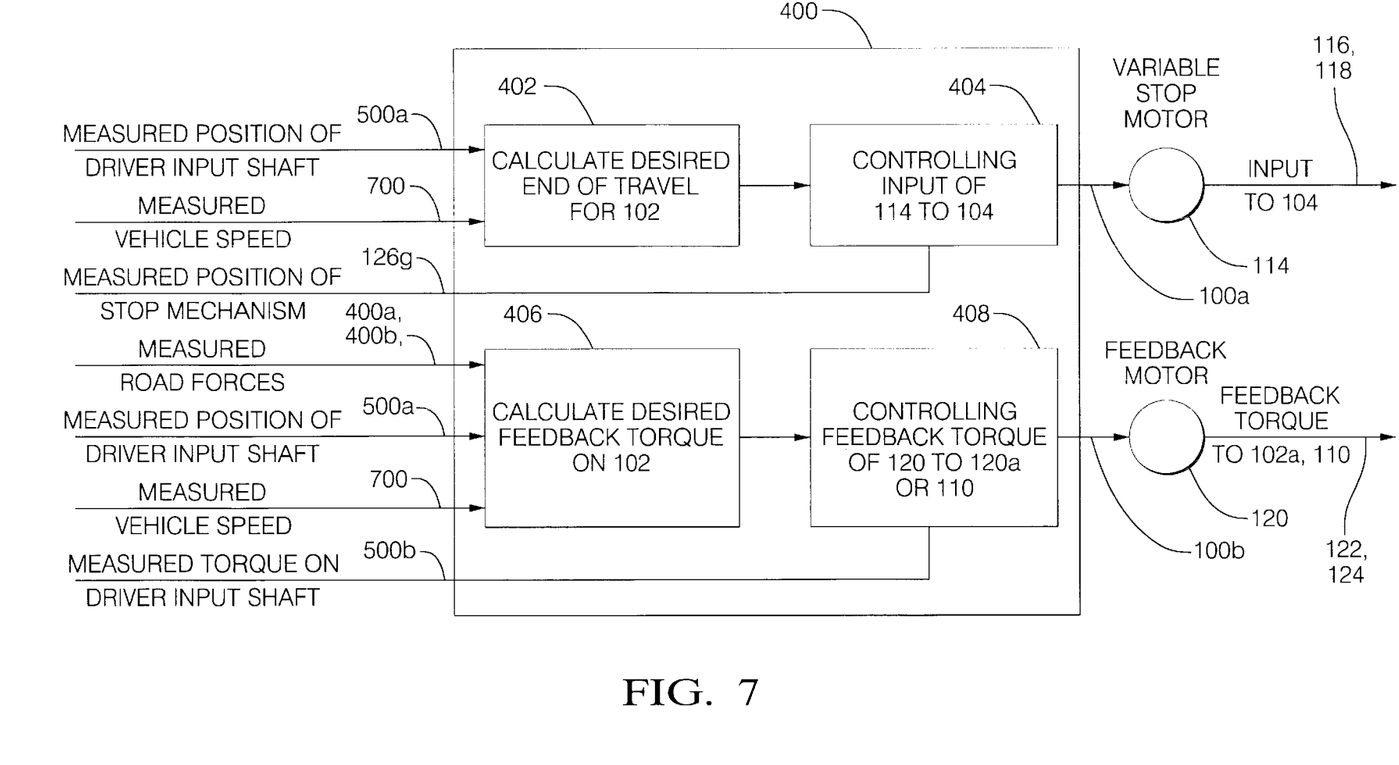
FIG. 7 is a schematic representation of the electronic control of the variable stop motor and the feedback motor of the present invention.

Reference will now be had to FIG. 7. FIG. 7 is a schematic representation of the flow of input data to the controller 400 and the resultant output therefrom. In particular the input to the controller 400 includes the position of the driver input shaft 500a conveyed to the controller 400 by the driver input shaft 102; the vehicle speed 700; the road forces 400a, 400b acting upon the steer-by-wire system 600 through the first and second road wheels 200, 300; the position of the stop mechanism 126g; and the torque on the driver input shaft 500b. The present invention is therefore operative to provide a method of varying the gear ratio of a handwheel actuator of a steer-by-wire steering system. The method of varying the gear ratio comprises measuring the position of the driver input shaft 102, measuring the speed of the vehicle and, based thereupon at block 402 in FIG. 7, calculating the desired position of the end-of-travel of the driver input shaft 102. The method of varying the gear ratio further comprises measuring the position of the stop mechanism 126 and, based upon the aforesaid calculated desired position of the end-of-travel of the driver input shaft 102, providing a first control signal 100a at block 404 to the variable stop motor 114 for controlling the input of the variable stop motor 114 to the planetary gear train 104.

The present invention is also operative to provide a method of providing tactile response to a driver of a steer-by-wire handwheel actuator. The method of providing tactile response comprises measuring the road forces acting upon the steer-by-wire system 600; measuring the position of the driver input shaft 102; measuring speed of the vehicle; and based thereupon at block 406 in FIG. 7, calculating the desired feedback torque of the driver input shaft 102. The method further comprises measuring the torque of the driver input shaft 102; and based upon the aforesaid calculated desired feedback torque of the driver input shaft providing a second control signal 100b at block 408 to the feedback motor 120 for controlling the feedback torque of the feedback motor to the driver input shaft 102 or the carrier 110.

Figure 8:
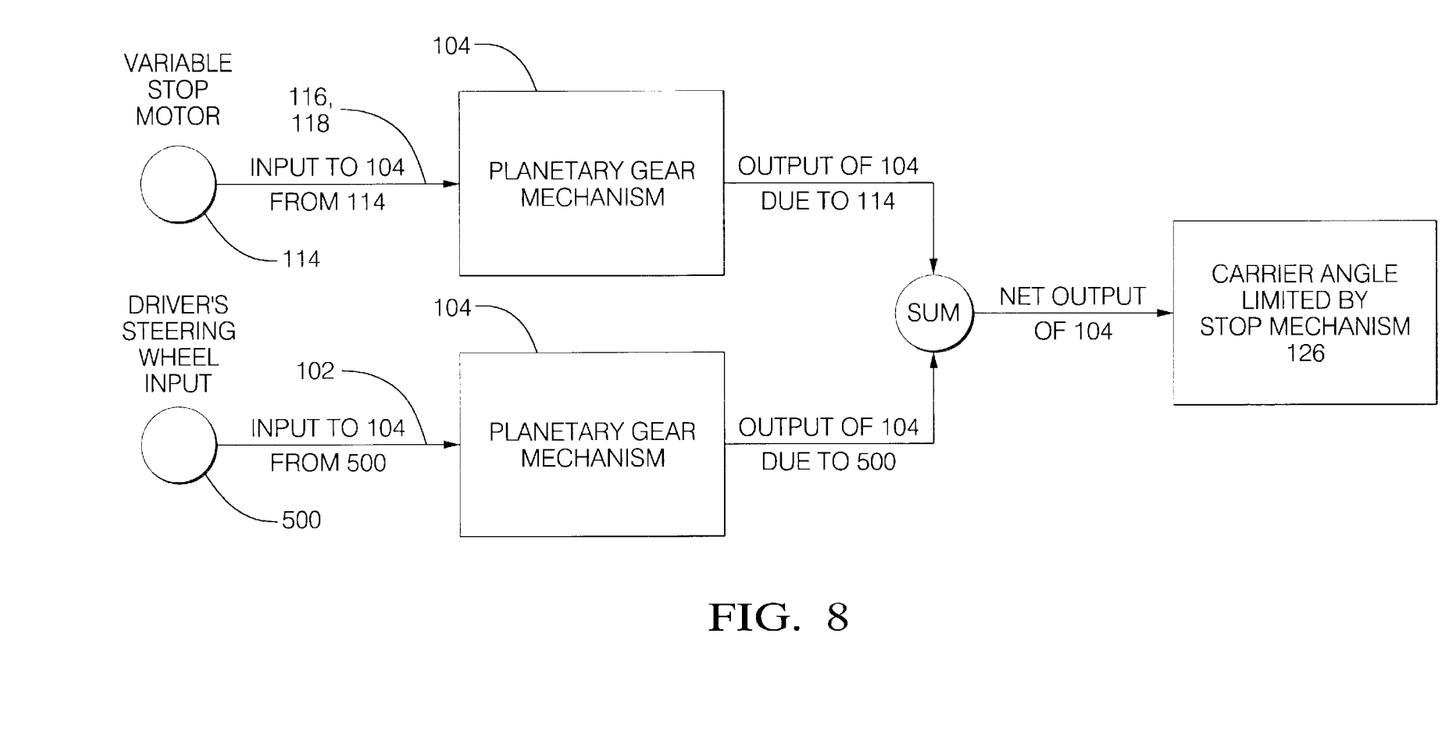
FIG. 8 is a schematic representation of the kinematic operation of the handwheel actuator of the present invention.

FIG. 8 is a schematic representation of the kinematic relationship of the variable stop motor 114 and the driver input shaft 102 to the planetary gear train 104 resulting in a net output thereof yielding a carrier 110 displacement limited by the stop mechanism 126.

It will be apparent to one skilled in the art that modifications may be made to the above described invention. The appended claims are therefore intended to embrace all such modifications that fall within the true spirit and intent of the invention.

What is claimed is:

1. A steer-by-wire handwheel actuator in a vehicle comprising:
   a controller operative to accept as input thereto data from the steer-by-wire system and generate therefrom control signals;
   a driver input shaft;
   a gear train connected to the driver input shaft;
   a variable stop motor responsive to the control signals from the controller and variably geared to the gear train;

a feedback motor responsive to the control signals from the controller and geared to one of the driver input shaft and the gear train; and a stop mechanism attached to a housing and coupled to one of the feedback motor and the gear train.

2. The steer-by-wire handwheel actuator as set forth in claim 1 wherein the gear train is a planetary gear train including a sun gear connected to the driver input shaft;

a ring gear having interior and exterior gear teeth thereto;

a plurality of planet gears coupled to the sun gear and the interior teeth of the ring gear; and a carrier connected to the plurality of planet gears.

3. The steer-by-wire handwheel actuator as set forth in claim 2 wherein the variable stop motor includes a variable stop motor shaft driven therefrom; and a variable stop assist gear connected to the variable stop motor shaft and coupled to the exterior gear teeth of the ring gear.

4. The steer-by-wire handwheel actuator as set forth in claim 2 wherein the feedback motor includes a feedback motor shaft driven therefrom; and a feedback motor assist gear connected to the feedback motor shaft and coupled to the carrier.

5. The steer-by-wire handwheel actuator as set forth in claim 2 wherein the driver input shaft includes a driver feedback gear coupled thereto.

6. The steer-by-wire handwheel actuator as set forth in claim 5 wherein the feedback motor includes a feedback motor shaft driven therefrom; and a feedback motor assist gear connected to the feedback motor shaft and coupled to the driver feedback gear.

7. The steer-by-wire handwheel actuator as set forth in claim 5 wherein the feedback motor includes a feedback motor shaft driven therefrom; and a feedback motor assist gear connected the feedback motor shaft and coupled to the driver feedback gear.

8. The steer-by-wire handwheel actuator as set forth in claim 2 wherein the stop mechanism includes a stop guide having a first stop end and a second stop end; and a collar coupled to the feedback motor shaft and the stop guide and operative thereby to travel between the first and second stop ends along the feedback motor shaft.

9. The steer-by-wire handwheel actuator as set forth in claim 2 wherein the stop mechanism includes a stop guide having a first stop end and a second stop end; and a collar coupled to the carrier and the stop guide and operative thereby to travel between the first and second stop ends along the carrier.

10. The steer-by-wire handwheel actuator as set forth in claim 2 wherein the stop mechanism includes a shaft connected to the carrier;

a stop guide having a first stop end and a second stop end;

a bar connected to the shaft and operative to rotate therewith between the first stop end and the second stop end.

11. A method of varying the gear ratio of a handwheel actuator of a steer-by-wire steering system comprising:

providing a controller operative to accept as input thereto data from the steer-by-wire system and generate therefrom control signals;

providing a driver input shaft;

providing a gear train connected to the driver input shaft;

providing a variable stop motor responsive to the control signals from the controller and variably geared to the gear train;

providing a stop mechanism attached to a housing and coupled the gear train.

12. The method as set forth in claim 11 further comprising measuring the position of the driver input shaft;

measuring the speed of the vehicle; and calculating the desired position of the end-of-travel of the driver input shaft.

13. The method as set forth in claim 12 further comprising measuring the position of the stop mechanism; and providing a first control signal to the variable stop motor for controlling the input of the variable stop motor to the planetary gear train.

14. A steer-by-wire handwheel actuator in a vehicle comprising:

a driver input shaft;

a gear train connected to the driver input shaft;

a variable stop motor responsive to control signals and variably geared-to-the gear train; and a stop mechanism attached to a housing and coupled the gear train.

15. The steer-by-wire handwheel actuator as set forth in claim 14 wherein the gear train is a planetary gear train including a sun gear connected to the driver input shaft;

a ring gear having interior and exterior gear teeth thereto;

a plurality of planet gears coupled to the sun gear and the interior teeth of the ring gear; and a carrier connected to the plurality of planet gears.

16. The steer-by-wire handwheel actuator as set forth in claim 15 wherein the variable stop motor includes a variable stop motor shaft driven therefrom; and a variable stop assist gear connected to the variable stop motor shaft and coupled to the exterior gear teeth of the ring gear.

17. A steer-by-wire handwheel actuator in a vehicle comprising:

a driver input shaft;

a gear train connected to the driver input shaft;

a feedback motor responsive to control signals and geared to one of the driver input shaft and the gear train; and a stop mechanism attached to a housing coupled to one of the feedback motor and the gear train.

18. The steer-by-wire handwheel actuator as set forth in claim 17 wherein the gear train is a planetary gear train including a sun gear connected to the driver input shaft;

a ring gear having interior and exterior gear teeth thereto;

a plurality of planet gears coupled to the sun gear and the interior teeth of the ring gear; and a carrier connected to the plurality of planet gears.

19. The steer-by-wire handwheel actuator as set forth in claim 18 wherein the feedback motor includes a feedback motor shaft driven therefrom; and a feedback motor assist gear connected to the feedback motor shaft and coupled to the carrier.

* * * * *